United States Patent [19]

Runyon et al.

[11] 3,905,438
[45] Sept. 16, 1975

[54] HYDRAULIC STEERING SYSTEM FOR OFF-HIGHWAY VEHICLE

[75] Inventors: F. Sheldon Runyon, Morton;
Lawrence D. Strantz, Washington;
Darryl S. Webb, Germantown Hills;
Charles E. Phenix, Peoria, all of Ill.

[73] Assignee: Westinghouse Air Brake Company, Pittsburgh, Pa.

[22] Filed: Nov. 1, 1974

[21] Appl. No.: 519,875

[52] U.S. Cl. .............................. 180/79.2 R; 60/404
[51] Int. Cl.[2] ........................................... B62D 5/06
[58] Field of Search ............... 180/79.2 R, 79.2 B; 60/404

[56] References Cited
UNITED STATES PATENTS

| | | | |
|---|---|---|---|
| 3,123,174 | 3/1964 | Bednar et al. | 180/79.2 B |
| 3,249,174 | 3/1966 | Orwig | 180/79.2 R |
| 3,439,768 | 4/1969 | Medley | 60/404 X |

FOREIGN PATENTS OR APPLICATIONS

| | | | |
|---|---|---|---|
| 1,224,123 | 2/1960 | France | 180/79.2 R |

*Primary Examiner*—David Schonberg
*Assistant Examiner*—John A. Pekar
*Attorney, Agent, or Firm*—Wolfe, Hubbard, Leydig, Voit & Osann, Ltd.

[57] ABSTRACT

A steering system for an off-highway truck or the like in which a pair of double acting hydraulic cylinders are coupled to the wheels with fluid being admitted to the cylinders from respective pressurized lines via a pair of steering valves of the blocked-center type mechanically coupled to the vehicle steering wheel. Each of the pressurized lines has an accumulator. The lines are supplied by a pump and unloading valve, with check valves being interposed between the unloading valve and the pressurized lines so that in the event of failure of a pressurized line associated with one of its cylinders the remaining cylinder remains effective to steer the vehicle safely to a stop. The pump is operated continuously but the unloading valve is so constructed that when a predetermined drop in pressure occurs at its outlet, fluid is passed through the check valves to replenish the fluid in the accumulators until a predetermined outlet pressure is reestablished, with the pumped fluid being thereafter diverted at low pressure to the sump, while pressure in the pressurized lines is maintained by the check valves.

6 Claims, 6 Drawing Figures

HYDRAULIC STEERING SYSTEM FOR OFF-HIGHWAY VEHICLE

BACKGROUND OF THE INVENTION

The invention relates generally to steering systems for off-highway vehicles, for example, the large capacity trucks employed in open pit mining operations. Because of the steering torque requirements it has been known to employ a hydraulic servo system between the vehicle wheels and the steering wheel in the cab, with the steering wheel operating a valve which feeds fluid to the hydraulic steering cylinders. It has further been known to employ an accumulator in the pressurized line and to isolate such line from the pump by a check valve so that the vehicle might be steered to a safe stop upon failure of the pump. Further it has been known to incorporate redundancy into a vehicle steering system. However, in spite of use of an accumulator and in spite of redundancy, steering systems for off-highway vehicles have not possessed the desired degree of overall reliability largely because of shortcomings in the pumping system including the relatively short life of intermittently operated pumps and failure of the usual pumping system to replenish the pressurized lines anc accumulators, when the system calls for fluid, on a rapid, reliable basis.

SUMMARY OF THE INVENTION

It is, accordingly, an object of the present invention to provide a steering system for an off-highway vehicle using a pair of steering cylinders, dual control valves and dual pressurized lines and accumulators in which both of the pressurized lines are supplied, through isolating check valves, by a constantly running positive displacement pump and associated unloading valve for rapid replenishment of the system.

It is a related object to provide a steering system for an off-highway vehicle in which an unloading valve, fed by a constantly running positive displacement pump, is provided which is capable of responding reliably and instantaneously to calls for fluid so that the pressure in the steering system is at a reliably high level while nevertheless reducing the demands upon the pump by permitting it to operate in an unloaded condition during those times when pressure fluid is not required, thus bringing about substantial improvement in the life of the pump. It is a related object to provide a steering system which is more efficient, in the utilization of energy, than the systems heretofore available and in which the energy usually lost in the heating up of the pressure fluid during any idle portion of the cycle is conserved so that fluid remains at a safe low temperature with no need to resort to an auxiliary cooling system.

The above objectives are obtained by providing separate hydraulic systems utilizing respective wheel cylinders at the steered wheels, controlled by separate valves at the steering position and having separate pressurized lines with accumulators and check valves, but with the wheels being mechanically interconnected by a tie rod or the like. The separate pressurized lines are jointly fed by a pressure-responsive unloading arrangement supplied by a constantly running pump of a positive displacement type. For replenishment of system pressure and for switching of the pump into its unloaded condition, the unloading arrangement includes a two-way poppet which, in one position, seals a return port, or sump, to supply fluid to the pressurized lines. The buildup of pressure to rated level is sensed by a calibrated sensing valve which promptly vents the poppet so that the fluid subsequently pumped by the positive displacement pump is discharged at low pressure into the sump. When the pressure at the outlet of the unloading device drops by a predetermined percentage, this promptly detected by the sensing valve which admits fluid controllingly to the poppet for resealing of the return port and immediate replenishment of the fluid in the system.

DETAILED DESCRIPTION OF PREFERRED EMBODIMENT

Figure 1:
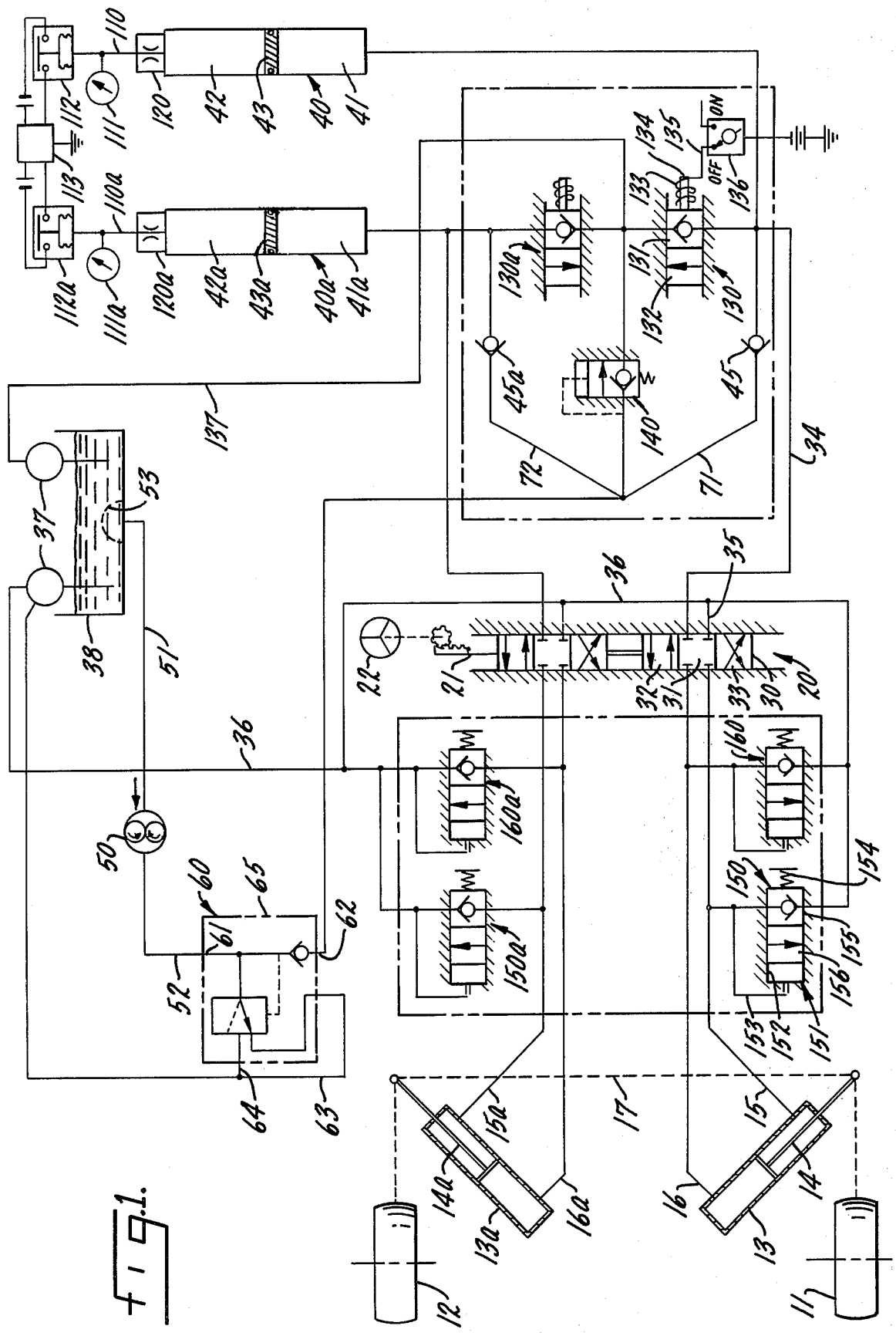
FIG. 1 is a schematic diagram showing a hydraulic steering system in accordance with the present invention.

Referring now to FIG. 1 there is disclosed, in schematic form, an hydraulic circuit illustrative of the present invention. Since the truck upon which the system is installed is of a known constuction not part of the present invention, it suffices to say that such truck has steered left and right hand wheels 11, 12. Connected to the wheels are double acting actuators, or steering cylinders, 13, 13a having piston rods 14 14a and connections at their respective ends indicated at 15, 16 and 15a, 16a. The steering cylinders do not, however, control the wheels 11, 12 separately, but, on the contrary, the two cylinders, in performing their steering function, act in tandem, being interconnected by a suitable mechanical tie rod 17. As will be seen, it is one of the primary advantages of the present system that either one of the two cylinders 13, 13a is capable, acting alone, to steer both of the wheels 11, 12.

For the purpose of admitting fluid, alternatively, to the opposite ends of the actuators, a steering valve assembly 20 is provided having a mechanical connection diagrammatically indicated at 21 to the vehicle steering wheel 22. Suffice it to say that turning the wheel operates in the same direction and in the same degree upon both of the valve elements which respectively control the steering cylinders. The showing in FIG. 1 has purposely been simplified by omission of servo feedback elements since servo feedback from steered wheels is per se known and not a part of the invention.

As stated, and as one of the features of the present steering arrangement, two separate and individual hydraulic systems are used acting in tandem, to provide redundancy in the event that one of the two systems for any reason becomes disabled as might be caused, for example, by breakage of a pressurized line. Accordingly, attention will first be focused upon the system which controls the actuator 13 associated with the left hand vehicle wheel.

Included in the valve assembly 20, connected to the steering wheel, is a spool valve element 30 having a central, or blocking, portion 31 with through connections 32 at one end and crossed connections 33 at the other, the valve elements being illustrated in the blocking condition in which the piston of the actuator 13 is effectively locked in place. A pressurized line 34 feeds the valve element 30, and return line 35 leads, via a common line 36, to a filter 37 in a fluid sump 38. In carrying out the invention the pressurized line 34 has an accumulator 40 having a liquid side 41 which communicates directly with the line and having a gaseous side 42 separated by a piston 43. The construction of the accumulator will be understood to be conventional, with the accumulator serving as a fluid storage, and thus as an energy storage, device. As fluid enters the accumulator from a pump, to be referred to, via the pressurized line 34, the gas, which may for example be nitrogen, on the gaseous side 42 is compressed. Subsequently upon a drop in the pressure in the line 34 as fluid is consumed by the steering cylinder, the expansion of the gas on the gaseous side forces the stored fluid into the pressurized line which, as will be seen, permits steering to be effected for a short period of time even in the absence of a pump. To prevent retrograde movement of fluid out of the pressurized line 34, a check valve 45 of the ball type is used. Such a check valve is highly important to the present invention since it isolates the hydraulic system which has just been described to enable it to complete its steering function in the event that the pump becomes unable to function or in the event the pump is unable to develop pressure because of breakage of a line in the companion, or redundant, system. Since the companion system associated with wheel 12, is identical to that which has just been described, the same reference numerals will be employed, with subscript a, to represent structurally identical parts.

In accordance with the present invention the dual hydraulic systems referred to are both pressurized from a single continuously operating positive displacement pump which may, for example, be of of "gear" type having an associated unloading valve assembly with an output connection which jointly supplies fluid to both of the check valves 45, 45a, the unloadiing valve being so constructed that when a predetermined drop in pressure occurs at the outlet, fluid is passed through the check valves to replenish fluid in the accumulators until a predetermined outlet pressure is re-established. Thereafter the pumped fluid is diverted at low pressure to the sump while pressure in the pressurized lines is maintained by the check valves. Referring to the drawing, a gear pump 50 is employed having its input connected by a line 51 to a suction strainer 53 located in the bottom of the sump 38 and having its output 52 connected to an unloading valve assembly 60 which has an inlet connection 61, an outlet connection 62, a laterally extending return or sump connection 63 and an auxiliary connection 64, all of the connections being laterally formed in the valve body 65. The outlet, or system, connection 62 divides outside of the body, to provide a first leg 71 which serves to supply the wheel cylinder 13 and a second leg 72 which supplies the cylinder 13a.

The pump 50 has not been illustrated in detail. It suffices to say that it is a gear pump or equivalent pump of the positive displacement type, of high quality, and available, as a catalog item, with any required pressure and rate of flow capability. Because of the rapid response of the unloading valve and the storage capacity of the accumulators, a pump of limited pumping rate will suffice. The unloading valve assembly 60 has been illustrated, with stopped motion, in FIGS. 2–5 since it is desirable to understand the operation which occurs at each step in a typical replenishment cycle and the features which account for the reliable rapid response.

Figure 2:
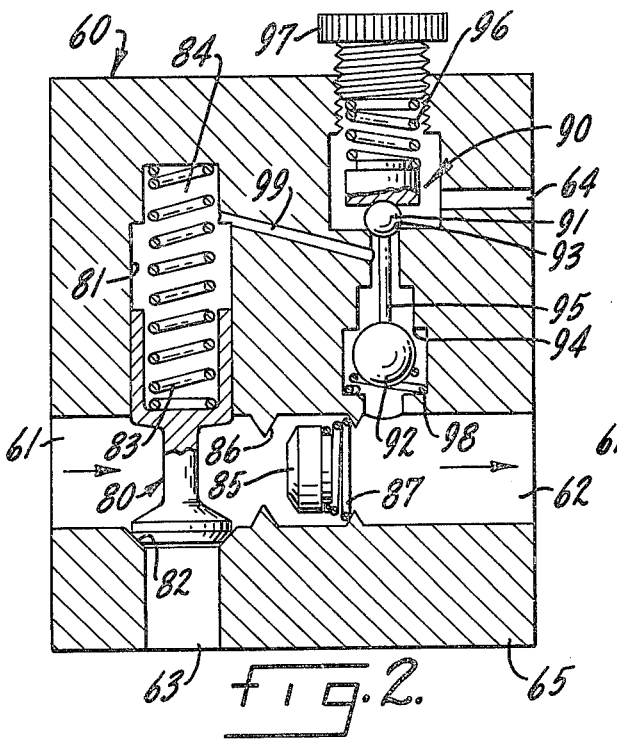
FIG. 2 is a vertical section taken through an unloading device utilized in the present invention in the act of replenishing the hydraulic lines.
Figure 3:
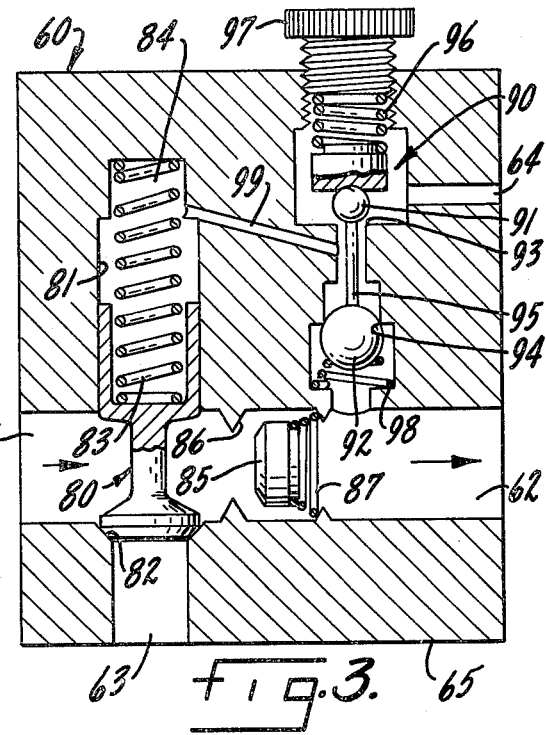
FIG. 3 shows a device of FIG. 2 upon reaching predetermined system pressure.

Thus referring to FIG. 2, a poppet 80 is provided slidable in a bore 81 and biased in the direction of a seat 82 by a light coil spring 83, which occupies a chamber 84 behind the poppet. With the poppet in the position shown, the return or sump port 63 is closed off and a main "straight through" connection is provided from the inlet port 61 to the system port 62. To prevent reverse flow from the system in the unloading position, a check valve 85 is provided which cooperates with the seat 86, toward which the valve element is pressed by a light spring 87. For the purpose of opening and closing the poppet, a sensing valve 90 is incorporated in the construction having first and second ball elements 91, 92 cooperating with ball seats 93, 94. The balls are effectively coupled together by a plunger 95 which is of such length that the balls do not seat simultaneously; that is, when one of the balls is seated, the other is cracked open. As illustrated in FIG. 2, the ball 91 is seated against its seat by a calibrated spring 96 having an adjusting screw 97. The lower ball 92 is biased upwardly with a light force by a coil spring 98. Flow of fluid into and out of the chamber 84 behind the poppet occurs through a bleed passage 99 leading to a position between the balls.

As illustrated in FIG. 2 it will be assumed that fluid is flowing from the pump 50 into the port 61, unseated in the check valve 85, for passage into the system through the outlet or system port 62. During the time that the system is being replenished by fluid from the port 62, separation of the ball 92 from its seat 94 provides communication through the passage 99 to the chamber 84 behind the poppet so that the poppet continues to be retained in the seated position.

However, as the pressure at the outlet port 62 gradually builds up, such pressure being communicated to the underside of the ball 91, a point of pressure will be reached in which the force of the calibrated spring 96 will be overcome, causing separation between the ball 91 and seat 93 resulting in venting of fluid from the chamber 84. At the same time, upward movement of the ball 91 causes retreating movement of the plunger 95 so that the spring 98 is effective to raise the lower ball 92 into its sealing position illustrated in FIG. 3, thereby sealing the bleed passage 99 from system pressure. With ball 91 separated from seat 93, the upward pressure against the poppet caused by the fluid in passageway 61–62 is no longer resisted by fluid in the chamber 84, and the poppet therefore moves upwardly within the chamber, venting the fluid through passageway 99, past the ball 91, and out of the vent opening 64. Because of the extreme unbalance of forces which exist as soon as the lower end of the poppet leaves the seat 82, and since the vent path is relatively unobstructed, the upward motion of the poppet occurs with extreme rapidity.

Figure 4:
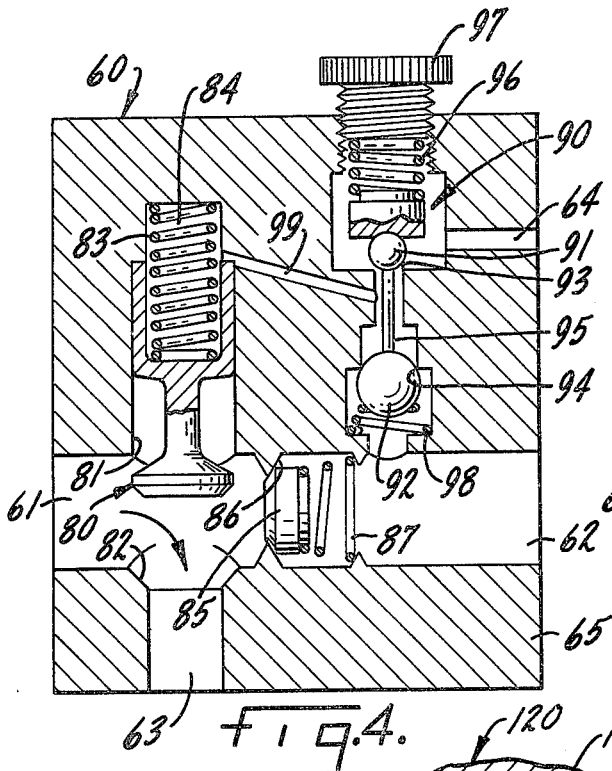
FIG. 4 shows the condition of the unloading device immediately subsequent thereto and during the unloading phase.
Figure 5:
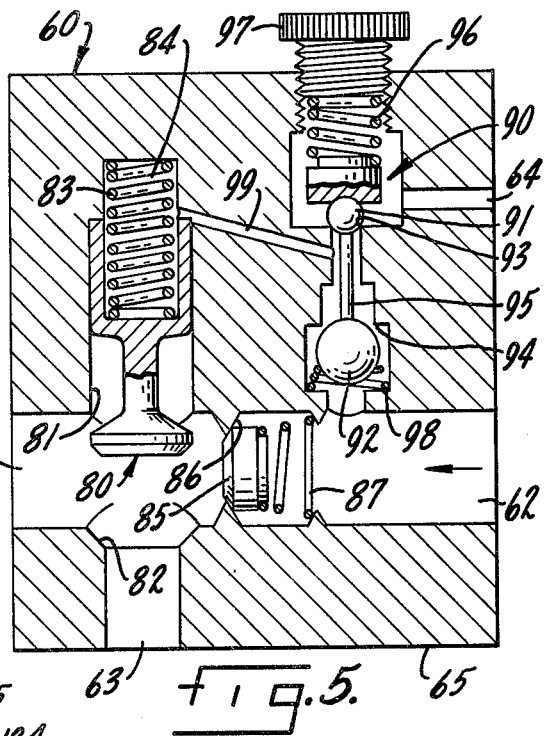
FIG. 5 shows the response of the sensing valve to a predetermined percentage drop in the system pressure signalling that replenishment is necessary and just prior to return to the condition of FIG. 2.

As soon as the poppet begins to leave the seat 82, the pressure at the left hand side of the check valve 85 drops causing the check valve to engage its seat 86, thereby isolating the system connected to the outlet port 62. This condition, which exists for a period of time after the hydraulic system has been replenished, is illustrated in FIG. 4, and the parts remain in this condition as the fluid begins to be utilized in the steering function, with the system pressure maintaining the ball 92 in its seated condition.

As the hydraulic fluid is consumed, a point of pressure will be reached at the output at which the force holding up the ball 92 is no longer effective to overcome the force of the calibrated spring 96 so that the spring pushes down the ball 91 and, via the plunger 95, the ball 92 as well, thereby establishing communication from the outlet port around the ball 92 and through the passageway 99 to the chamber 84 behind the poppet. This is the condition which has been illustrated in FIG. 5.

Because of the feeding of pressure fluid to the chamber behind the poppet, the poppet is forced downwardly into the condition illustrated in FIG. 2 in which the lower end of the poppet again seats against the seat 82, thereby closing off the sump or return port 63 so that the fluid fed into the inlet 61 is free to build up pressure forcing the check valve 85 again to its open condition and with the pressure fluid flowing through the outlet port 62, through the valves 45, 45a and through the pressurized lines 34, 34a into the accumulators. Of course if replenishment occurs at a time when the valves 30, 30a are displaced from the center position, calling for fluid to be furnished to the actuators, fluid will be furnished to such actuators directly from the pump and unloading valve. At all times the direction of fluid flow in the accumulators, whether in or out, is dependent upon the relative pressure exisiting in the accumulator as compared to the pressurized line to which it is connected.

It is characteristic of the illustrated construction of unloading valve assembly that the sensing valve will begin to call for replenishment when the pressure drops by a predetermined percentage from that for which the calibrated spring has been set. Employing predetermined seat diameters at 93, 94, the unloading valve can be caused to go into its replenishing mode upon a drop in system pressure of ten percent or less.

With the operation of the valve elements clearly in mind it is apparent that what has been provided is a main passageway including a poppet at the inlet and a sensing valve at the outlet with a check valve in between and with a lateral return port adjacent the inlet, sealed off by the poppet. Means are provided for defining a chamber behind the poppet which is connected by a bleed passageway to the sensing valve, the sensing valve being of the double-throw type having a calibrated spring and opposed valve elements (the balls) for cyclically connecting the bleed passage to the outlet when the outlet pressure is less than a predetermined level, say, 2500 pounds per square inch, and for connecting the bleed passage to a vent when the outlet pressure exceeds a predetermined level, the two pressures establishing a narrow range of system pressure.

Because of the use of a constantly running positive displacement pump, and because of the high speed of response of the illustrated unloading valve assembly, it is found that replenishment can begin within a matter of milliseconds from the time that the sensing valve 90 signals that the point of 90 percent of pressure has been reached. Since there is almost zero time lag in the unloading valve the pressure does not substantially penetrate the 90 percent level; in other words, the pressure in the parallel systems is maintained reliably within the range of 90 to 100 percent of rated. One of the advantages of maintaining the system pressure within a narrow high range is that the accumulators 40, 40a are kept in charged condition so that their fluid and energy storage capability is constantly available.

In the event that failure occurs in the system which is associated with one of the wheel cylinders, say, the cylinder 13, for example, the breakage of pressurized line 34, pressure will be lost in such line. In the case of a line breakage, as contrasted with a slow leak, fluid will escape at a rate which cannot be made up by the pump and accumulator, the result being that sufficient pressure is not available to develop steering pressure at the affected cylinder. In addition, the dropping of pressure in the line 34 has the effect of disastrously lowering the pressure of the fluid from the pump 50 and which is supplied through the outlet port 62 since the pumped fluid will be uselessly discharged through the check valve 45, making any pressure buildup impossible.

However, because of the isolating effect of the check valve 45a pressure is maintained, by the accumulator 40a, in the line 34a. Thus as long as the fluid in the accumulator 40a lasts, such fluid will be available, in pressurized form, in line 34a to be directed to one side or the other of the steering cylinder 13a as the steering wheel may direct. In a practical system, the storage capability of the accumulators is chosen to provide sufficient reserve capacity for the making of one 90° and two 45° turns so that the vehicle may be safely steered from the pathway to a position of safety until repairs can be effected.

In carrying out the invention a signal is immediately given to the operator of the vehicle in the event that pressure should fail in either one of the two parallel hydraulic systems. Thus, leading from the gaseous side 42 of the accumulator 40 is a gas line 110 connected to a pressure gauge 111 and a pressure switch 112, the latter having contacts for operating a buzzer or other audible alarm 113. Similarly the actuator 40a has a line 110a and a gauge 111a as well as a pressure switch 112a capable of operating the alarm. The driver is alerted in the event of hearing the audible alarm or in the event of noting the drop in pressure on the gauge to immediately pull the vehicle off the pathway into safe position.

Figure 6:
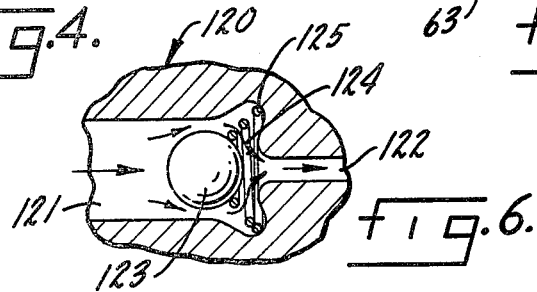
FIG. 6 is a cross-section of a pneumatic fuse employed in the present system.

In accordance with one of the more detailed aspects of the invention, a velocity fuse 120 is incorporated in the gas line 110 so that in the event such line is broken or springs a major leak the gaseous side 42 of the accumulator will be promptly sealed. The construction of the velocity fuse 120 will be apparent in FIG. 6 where it will be noted that the fuse has an inlet 121 and an outlet 122 of relatively smaller diameter. In centered position is a ball 123 which, combined with the limited size of the outlet port directs the gas to flow convergently as indicated at 124 causing a force to be exerted upon the ball to the right in accordance with the well known principle of Bernoulli. Such force is normally resisted by a conical spring 125. However, upon breakage of line 110 causing a high velocity flow, the force acting upon the ball becomes sufficient to overcome the force of the spring, thereby sealing off the discharge opening 122 and preventing any further loss of the gas. In short, the function and integrity of the accumulator are preserved.

A further feature of the present hydraulic steering system resides in the provision of bleed down valves for the respective pressurized lines 34, 34a. Thus for line 34 we provide a valve 130 having a valve spool with a first section 131 which contains a check valve and a second section 132 which provides a bleed passage. The valve spool is actuated by a solenoid 133 having an armature 134, with the parts normally occupying the position shown in the drawing. A contact 135 is provided in the ignition switch 136, the contact being "made" when the ignition switch is turned to its "off" condition. Thus when the system is shut down, the solenoid 133 is energized drawing the valve spool to its alternate condition in which a bleed connection is established to a line 137 leading to the sump 38. In this way pressurized fluid is allowed to leak from the accumulator 40 so that the stored energy of the fluid cannot be effective to result in injury to one who might happen to be near one of the vehicle wheels under "rest" condition when the steering wheel 22 is turned.

A similar solenoid bleed valve 130a is provided for bleeding line 34a and its associated accumulator 40a. If desired, a timer may be employed for opening up the circuit of contact 135 after an appropriate bleed time interval which might, for example, be something on the order of 40 seconds, thereby to prevent continued battery drain.

If desired, a relief valve 140 may be provided at the outlet of the unloading valve assembly and set for a pressure higher than the normal system pressure, for example, on the order of 3,000 pounds per square inch, to insure that the system pressure, upon possible malfunction of the unloading valve assembly will, under no circumstances, exceed a safe level.

As a still further feature of the invention replenishing type relief valves are connected to each end of each of the steering cylinders. Taking the cylinder 13 by way of example, a relief valve 150 is associated with connection 15, the valve having a spool or plunger 151 slidable in a bore 152 having a connection 153 to the actuator, and with the spool being held in the illustrated "replenishing" mode by means of a spring 154.

With zero or low pressure at cylinder connection 15, the spool section 155 is in active position, the check valve being so oriented that fluid may be furnished from the sump line 35 (which is normally under about 18 pounds per square inch pressure) thereby avoiding any possibility of "cavitation" in the end 15 of the cylinder. Conversely, where high pressure exists at the end 15, such pressure acting through line 153, will cause the valve spool section 156 to move into active position. It will be understood that section 156 contains a relief valve which is set to yield or a pressure which is higher than system pressure, but nevertheless at a safe level. A similar valve is associated with the opposite end 15 cylinder with corresponding parts given corresponding reference numerals plus 10.

The operation of the valves 150, 160 will be apparent, assuming that the wheels of the vehicle are forcibly twisted upon striking an obstruction. Such forcible twisting, with the steering valves 30, 30a in blocked condition, will cause an excess of pressure to be developed at one end of the cylinder 13 while the other end of the cylinder tends to "cavitate." Thus the relief valve which is subject to the excess pressure will shift to its alternate mode to provide a relief function while the companion valve will remain in the condition shown providing replenishment from the sump line 35 to relieve the cavitation.

Corresponding valves 150a, 160a, working in the same way, are provided for the alternate wheel cylinder 13a.

It will be apparent that the objects of the invention are amply fulfilled, providing a steering system having a heretofore unavailable level of reliability in the face of failure of a pressurized line or associated component plus a high degree of operating efficiency due to the use of the constantly running positive displacement pump and its associated, rapidly operating unloading valve assembly.

The practice of the invention is not limited to the use of any specific hydraulic components and it is one of the features of the present invention, contributing to its economy, that the claimed system may be assembled using individual components available on the commercial market from various sources, Kemp Industries, by way of example.

We claim:

1. In a steering system for an off-highway vehicle having a pair of steerable wheels, the combination comprising, double acting hydraulic steering cylinders coupled to the wheels, means for interconnecting the wheels for steering in unison, a pair of pressurized hydraulic lines, a return line having an associated sump, a pair of steering valves interposed between the pressurized lines and the respective steering cylinders and mechanically connected to the vehicle steering wheel, the steering valves having provision for drainage to the sump, each of the steering valves being of the type having a blocked center position and having alternate end positions in which respective ends of the cylinders are pressurized for steering to right and left, a continuously operating positive displacement pump having an associated unloading valve for pumping of hydraulic fluid from the sump into the pressurized lines, accumulators in the pressurized lines, respective check valves interposed between the outlet of the unloading valve and the pressurized lines so that in the event of failure of the pressurized line associated with one of the cylinders the remaining cylinder remains effective to steer the vehicle to a stop, the unloading valve having a main inlet-outlet passageway and a return port with a poppet at the inlet for sealing off the return port and a pressure sensing valve at the outlet for controlling the poppet so that when a predetermined drop in pressure occurs at the outlet, the sensing valve operates the poppet to feed fluid through the check valves to replenish fluid in the accumulators until a predetermined outlet pressure is reestablished and to thereafter divert the pumped fluid at low pressure through the return port while pressure in the pressurized lines is maintained by the check valves.

2. In a steering system for an off-highway vehicle having a pair of steerable wheels, the combination comprising, double acting hydraulic steering cylinders coupled to the wheels, means for interconnecting the wheels for steering in unison, a pair of pressurized hydraulic lines, a return line having an associated sump, a pair of steering valves interposed between the pressurized lines and the respective steering cylinders and mechanically connected to the vehicle steering wheel, the steering valves having provision for drainage to the sump, each of the steering valves being of the type having a blocked center position and having alternate end positions in which respective ends of the cylinders are pressurized for steering to right and left, a continuously operating positive displacement pump having an associated unloading valve for pumping of hydraulic fluid from the sump into the pressurized lines, accumulators in the pressurized lines, respective check valves interposed between the outlet of the unloading valve and the pressurized lines so that in the event of failure of the pressurized line associated with one of the cylinders the remaining cylinder remains effective to steer the vehicle to a stop, the unloading valve being so constructed that when a predetermined drop in pressure occurs at its outlet, fluid is passed through the check valves to replenish fluid in the accumulators until a predetermined outlet pressure is reestablished and to thereafter divert the pumped fluid at low pressure to the sump while pressure in the pressurized lines is maintained by the check valves, pressure gauges in the cab of the vehicle connected by lines to the gaseous sides of the respective accumulators and velocity fuses interposed between the accumulators and the gauges for curtailing loss of gaseous pressure in an accumulator upon failure of a gauge or its associated line.

3. In a steering system for an off-highway vehicle having a pair of steerable wheels, the combination comprising, double acting hydraulic steering cylinders coupled to the wheels, means for interconnecting the wheels for steering in unison, a pair of pressurized hydraulic lines, a return line having an associated sump, a pair of steering valves interposed between the pressurized lines and the respective steering cylinders and mechanically connected to the vehicle steering wheel, the steering valves, having provision for drainage to the sump, each of the steering valves being of the type having a blocked center position and having alternate end positions in which respective ends of the cylinders are pressurized for steering to right and left, a continuously operating positive displacement pump having an associated unloading valve for pumping of hydraulic fluid from the sump into the pressurized lines, accumulators in the pressurized lines, respective check valves interposed between the outlet of the unloading valve and the pressurized lines so that in the event of failure of the pressurized line associated with one of the cylinders the remaining cylinder remains effective to steer the vehicle to a stop, the unloading valve being so constructed that when a predetermined drop in pressure occurs at its outlet, fluid is passed through the check valves to replenish fluid in the accumulators until a predetermined outlet pressure is reestablished and to thereafter divert the pumped fluid at low pressure to the sump while pressure in the pressurized lines is maintained by the check valves, solenoid-operated bleed-down valves in the respective pressurized hydraulic lines having an energized mode in which fluid is leaked from the accumulators, and means for energizing the solenoids automatically incident to shutting down the vehicle.

4. In a steering system for an off-highway vehicle having a pair of steerable wheels, the combination comprising, double acting hydraulic steering cylinders coupled to the wheels, means for interconnecting the wheels for steering in unison, a pair of pressurized hydraulic lines, a return line having an associated sump, a pair of steering valves interposed between the pressurized lines and the respective steering cylinders and mechanically connected to the vehicle steering wheel, the steering valves having provision for drainage to the sump, each of the steering valves being of the type having a blocked center position and having alternate end positions in which respective ends of the cylinders are pressurized for steering to right and left, a continuously operating positive displacement pump having an associated unloading valve for pumping of hydraulic fluid from the sump into the pressurized lines, accumulators in the pressurized lines, respective check valves interposed between the outlet of the unloading valve and the pressurized lines so that in the event of failure of the pressurized line associated with one of the cylinders the remaining cylinder remains effective to steer the vehicle to a stop, the unloading valve being so constructed that when a predetermined drop in pressure occurs at its outlet, fluid is passed through the check valves to replenish fluid in the accumulators until a predetermined outlet pressure is reestablished and to thereafter divert the pumped fluid at low pressure to the sump while pressure in the pressurized lines is maintained by the check valves, a replenishing type relief valve interposed between each end of each steering cylinder and the return line, the relief valve having a high pressure relief element for release of fluid to the return line upon compression of the fluid at one end of the actuator upon striking an obstruction and including an associated check valve for admitting a corresponding amount of fluid from the return line to the other end of the cylinder.

5. In a steering system for an off-highway vehicle having a pair of steerable wheels, the combination comprising, double acting hydraulic steering cylinders coupled to the wheels, means for interconnecting the wheels for steering in unison, a pair of pressurized hydraulic lines, a return line having an associated sump, a pair of steering valves interposed between the pressurized lines and the respective steering cylinders and mechanically connected to the vehicle steering wheel, the steering valves having provision for drainage to the sump, each of the steering valves being of the type having a blocked center position and having alternate end positions in which respective ends of the cylinder are pressurized for steering to right and left, a continuously operating positive displacement pump having an associated unloading valve assembly for pumping of hydraulic fluid from the sump into the pressurized line, accumulators in the pressurized lines, respective check valves interposed between the outlet of the unloading valve assembly and the pressurized lines so that in the event of failure of the pressurized line associated with one of the cylinders the remaining cylinder remains effective to steer the vehicle to a stop, the unloading valve assembly having a main inlet-outlet passageway including a poppet at the inlet and a sensing valve at the outlet with a check valve in between, a lateral return port adjacent the inlet for directing the flow at low pressure when the poppet is open, the sensing valve having a passage providing free communication with the space behind the poppet and having means including first and second differential valve elements for connecting the space to the outlet when the pressure at the output is less than a predetermined pressure and for connecting the space to a vent when the pressure at the outlet is greater than a predetermined narrow differential pressure so that the valve assembly feeds fluid to the pressurized lines to keep both of them constantly within a pressure range determined by the narrow differential.

6. In a steering system for an off-highway vehicle having a pair of steerable wheels, the combination comprising, double acting hydraulic steering cylinders coupled to the wheels, means for interconnecting the wheels for steering in unison, a pair of pressurized hydraulic lines, a return line having an associated sump, a pair of steering valves interposed between the pressurized lines and the respective steering cylinders and mechanically connected to the vehicle steering wheel, the steering valves having provision for drainage to the sump, each of the steering valves being of the type having a blocked center position and having alternate end positions in which respective ends of the cylinder are pressurized for steering to right and left, a continuously operating positive displacement pump having an associated unloading valve assembly for pumping of hydraulic fluid from the sump into the pressurized lines, accumulators in the pressurized lines, respective check valves interposed between the outlet of the unloading valve assembly and the pressurized lines so that in the event of failure of the pressurized line associated with one of the cylinders the remaining cylinder remains effective to steer the vehicle to a stop, the unloading valve assembly having a main-outlet passageway including a poppet at the inlet and a sensing valve at the outlet with a check valve in between, a lateral return port adjacent the inlet, the poppet being movable transversely with respect to the main passageway for sealing off the return port, means defining a chamber behind the poppet and into which the poppet is slidable, the chamber being connected by a bleed passage to the sensing valve, the sensing valve being of the double-throw type having a calibrated spring and opposed valve elements for cyclically (a) connecting the bleed passage to the outlet when the pressure at the outlet is less than a predetermined pressure for furnishing of fluid from the outlet to close the poppet and (b) connecting the bleed passage to a vent when the pressure at the outlet exceeds a predetermined pressure for unseating of the poppet and discharge of the fluid at low pressure through the return port accompanied by closure of the check valve.

* * * * *